March 27, 1928.                                                    1,663,640
A. PAIS
HEATING DEVICE
Filed Oct. 3, 1925                3 Sheets-Sheet 1
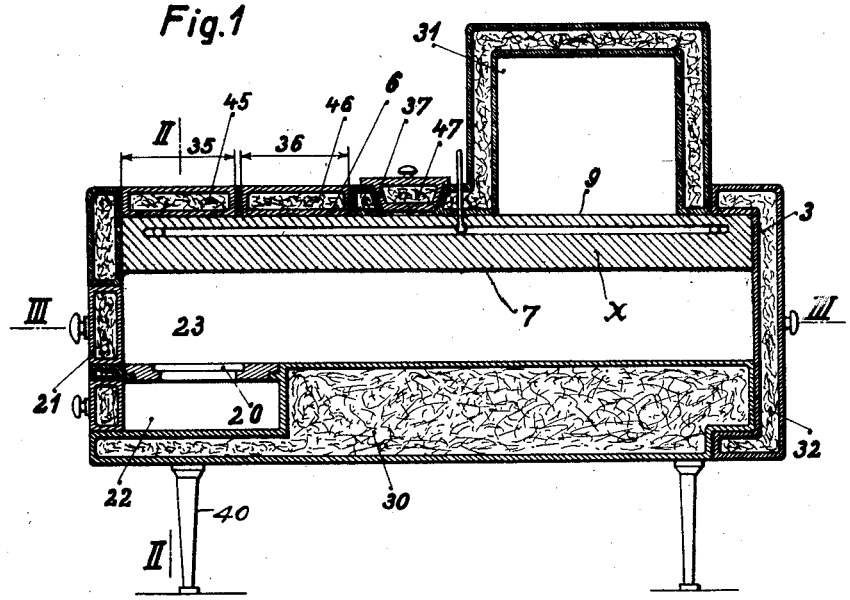
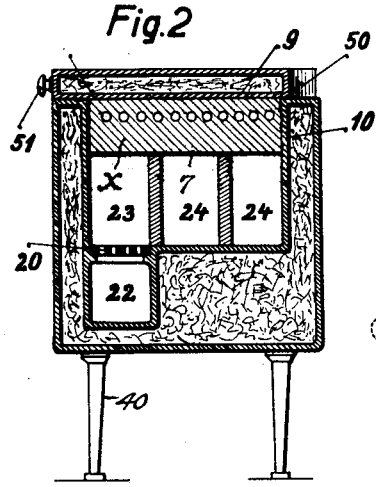
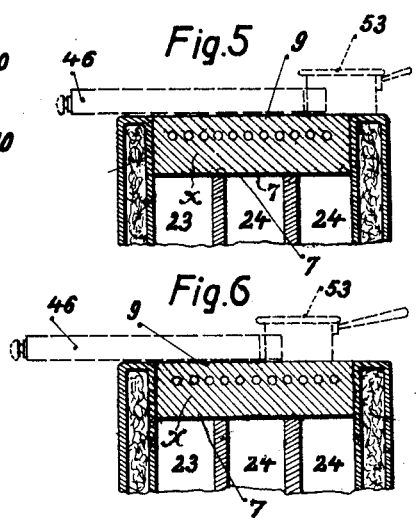
Inventor
Alexander Pais
by
   his Attorney March 27, 1928.
A. PAIS
1,663,640
HEATING DEVICE
Filed Oct. 3, 1925     3 Sheets-Sheet 2
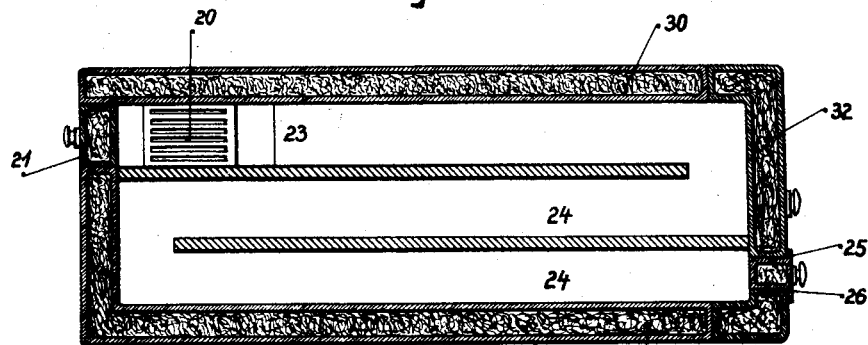
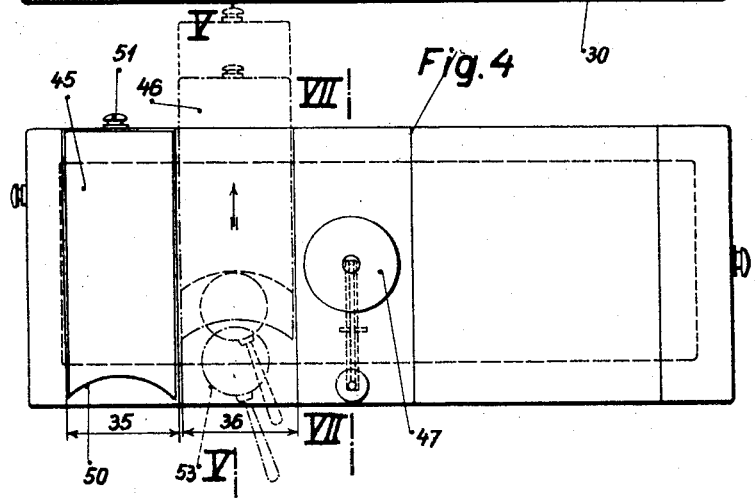
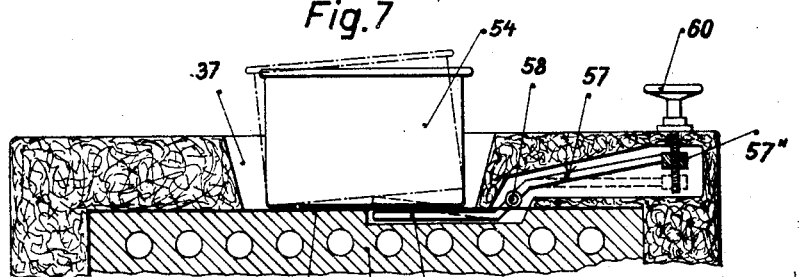
Inventor
Alexander Pais
by his Attorney

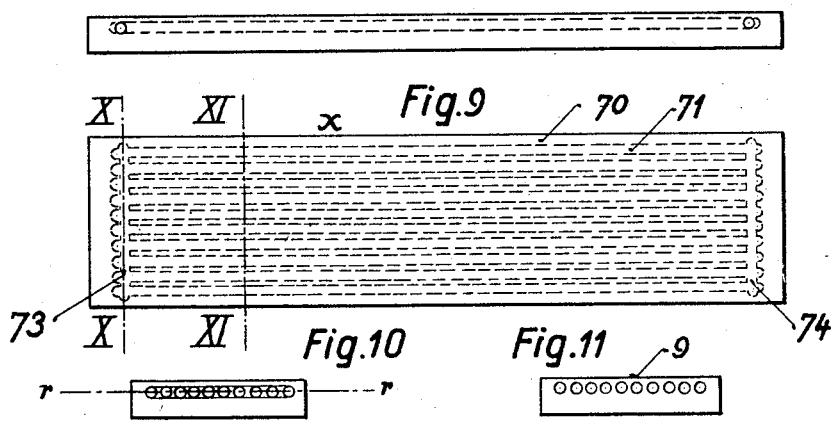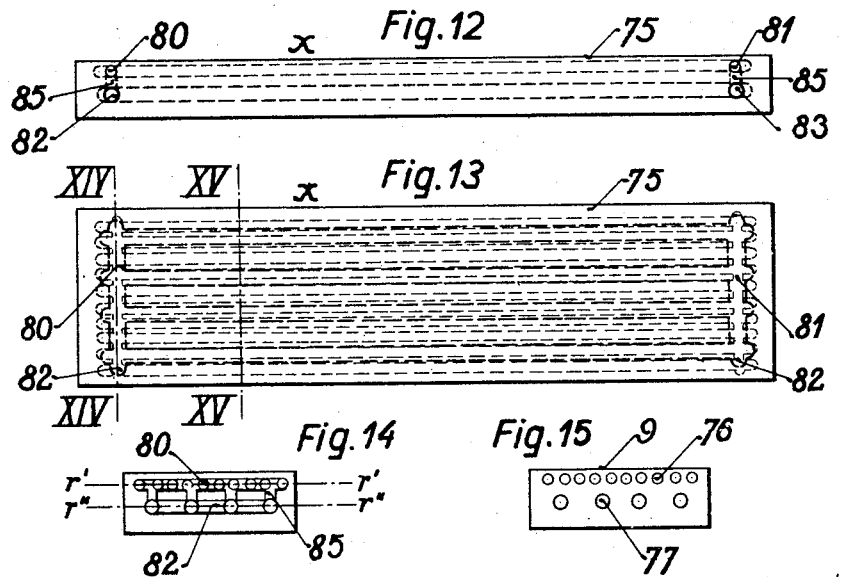

Patented Mar. 27, 1928.

1,663,640

UNITED STATES PATENT OFFICE.

ALEXANDER PAIS, OF BUCHAREST, RUMANIA, ASSIGNOR TO THEODOR POPESCU, ALEXANDER PAIS, AND CONSTANTIN PAIS, ALL OF BUCHAREST, RUMANIA.

HEATING DEVICE.

Application filed October 3, 1925, Serial No. 60,361, and in Austria August 8, 1925.

In order to provide economical heating arrangements for all kinds of industrial purposes, very many different kinds of heating devices have been proposed comprising a heating body charged with a temperature equalizing medium, for example heating devices with Perkins tubes, hot water or steam heating, and the like. If however, these known heating devices are adapted for one purpose, they are unsuitable for other industrial and domestic purposes. This is particularly the case with kitchen stoves of the usual type, the manipulation and manner of operation of which have for long been standardized. It has not hitherto been found possible when applying the means used in the above mentioned industrial heating plants to kitchen stoves, to maintain these well-known characteristics. Efforts have been made to overcome these disadvantages by the use of cooking boxes completely surrounded by insulating material and provided with individual heating heating arrangements but heating devices of this description require different handling from that which has been usual in the past and moreover do not provide the economy sought for.

The present invention furnishes a solution of the problem set forth and according to the invention there is provided as a heating body, a metal block which is heated from a source of heat and which is provided internally with a plurality of inter-connected passages charged once and for all with a temperature equalizing medium, the metal block being completely enveloped in heat insulating material, excepting at those parts of its surface which cooperate with the heat source, and at those parts of its surface which serve to deliver up heat.

In the accompanying drawings is illustrated a kitchen stove as a constructional example of the invention.

Fig. 1 shows the stove in a diagrammatic longitudinal section.

Fig. 2 is a cross section on the line II—II of Fig. 1.

Fig. 3 shows a longitudinal section on the line III—III of Fig. 1.

Fig. 4 shows a plan view of the stove.

In Figs. 5 and 6 is shown, in two characteristic positions, one form of means for the regulation of the heat delivery, these figures being cross sections on the line V—V of Fig. 4.

Fig. 7 shows, to an enlarged scale, a second form of regulating device for the heat delivery, in cross section on the line VII—VII of Fig. 4.

Figs. 8–11 show a constructional form of block in side elevation, plan and section on the lines X—X and XI—XI of Fig. 9.

In Figs. 12–15 is shown a second constructional form of block in side elevation, plan and in cross section on the lines XIV—XIV and XV—XV of Fig. 13.

The stove according to Figs. 1–7 comprises a metal block $x$ which, as will be described later, is traversed internally by a system of closed pressure and gas tight passages. The system of passages is charged once for all with a temperature equalizing medium which may be heated in the constant volume of the passage system without its mass changing.

A heating device is provided under the block $x$ and delivers its heat to the under side 7 of the block. The heating device consists of a grate 20, a fire door 21, an ashpan 22, a fire space 23, a plurality of flame passages 24 (Fig 3) and a flue 25 which may be closed by means of the stopper 26. The block and the heating device are covered in a suitable manner by means of insulating bodies. The insulating bodies are arranged partly fixed and partly movable relative to the block $x$ and the heating device. The fixed insulating bodies 30 enclose a hollow space 22, 23, 24. For cooking purposes, an oven 31 is provided on the heat delivering surface 9. The rear end of the stove is closed by a lid 32 constructed as an insulating body. The upper wall of the hollow space which lies upon the heat delivering surface 9 of the block $x$ is provided here and there with openings 35, 36, 37 which may be opened and closed by movable members which are made to fit the openings and are constructed so as to be heat insulated.

The openings 35, 36 run transversely across the whole breadth of the stove. The members 45 and 46 which cooperate with these openings are formed as sliders. The sliders 45, 46 are provided with curved recesses 50 upon one of their small sides. On the other small side of each is provided a handle 51 for actuating the slider. If the sliders 45 and 46 are in the position of the slider 45 in Fig. 4, then the heat delivery openings 35 and 36 are completely covered. By moving the sliders 45, 46 in the direction indicated by the arrow in Fig. 4, the size of the heat delivery surface and consequently the amount of heat delivered to the object which is to be heated, for example a saucepan 53, may be controlled (see for example the position of the slider 46 in Figs. 4, 5 and 6). The opening 37 shown in Figs. 1, 4 and 7 is circular, tapers towards the heat delivering surface 9 and may be closed by means of a tapering cover 47. In the neighbourhood of the opening 37 there is similarly an arrangement for regulating the heat delivery to the object which is to be heated, for example the saucepan 54. This regulating arrangement consists of a two-armed lever 57 which is mounted so as to be rotatable about the axis 58. One arm 57' of the lever is situated in a slot in the block $x$ in such a manner that the end of the arm 57' lies approximately in the middle of the opening 37. The second arm 57" of the lever may be adjusted by means of the adjusting screw 60. If the regulating device is in the position shown in full lines in Fig. 7, the saucepan 54 rests completely upon the heat delivering surface 9 of the opening 37. In this position heating of the saucepan 54 takes place. If it is desired to interrupt the heating it is only necessary to rotate the screw 60 so that the lever 57 takes the position shown in the dotted lines. By rocking the lever 57 the saucepan is raised from the heat delivering surface 9 and the heating of the saucepan is consequently interrupted by the interposition of air. The openings 35, 36, 37 extend to the heat delivering face 9 of the block $x$. The insulating container together with the whole of its contents rests upon four feet 40.

The metal block $x$ is shown in one form in Figs. 8 to 11 and in another form in Figs. 12 to 18. The block shown in Figs. 8–11 consists of a metal plate 70 in which a plurality of parallel passages 71 are provided. The passages 71 are arranged in a row $r$—$r$ parallel to the heat delivering surface 9. The ends of the passages are interconnected by transverse passages 73, 74. In the system of passages consisting of passages 71, 73, 74 which intercommunicate with one another, is inserted once and for all the substance which, between the temperature limits within which the stored heat is to be used, is in the condition of a saturated vapour under pressure.

In the constructional example occording to Figs. 12–15 the block $x$ consists of a metal plate 75 which is transversed longitudinally by passages 76, 77. The passages 76 are of smaller diameter and lie in a row $r'$—$r'$ parallel to the heat delivering surface 9. The passages 77 are of larger diameter and lie in a row $r''$—$r''$ beneath the passages 76. The passages 76 are interconnected by transverse passages 80, 81 and the passages 77 are interconnected by transverse passages 82, 83. The transverse passages 80, 82 and 81 83 respectively are further interconnected by short vertical passages 85. It follows, therefore, that the whole of the longitudinal passages 76, 77 in the block $x$ are in communication with one another.

The construction of the block $x$ according to Figs 8–15 may be carried out in many different ways. Preferably the block $x$ consists of cast iron or steel plate with cast in passages. Thus the passages may consist of tubes, for example Mannesmann tubes, which are cast in simultaneously with the casting of the block. The action of the temperature equalizing means depends upon the fact that the heat is supplied so uniformly to the whole system of passages and thence to the whole mass of the block that the block, both when heating up and also when cooling, is at the same temperature throughout. The method of operation of the temperature equalization is as follows:

The nature and quantity of the temperature equalizing medium which is inserted within the passage system of the block once and for all, are so selected that, within the temperature limits between which the heat is to be used, they are partly in the condition of a saturated vapour. If, for example, temperatures of from 100° C. to 240° C. are required, alcohol, water, etc., are inserted in the passage system of the block, that is to say a substance which between these limits is in the condition of a saturated vapour.

The manipulation and operation of the stove which has been described is as follows: Before the stove is heated the stopper 26 is removed, the flue 25 placed in connection with a chimney and, after the placing of fuel upon the grate 20, the heating device is put into action. The temperature equalizing medium which has been enclosed once and for all, so as to be pressure and gas tight within the passages in the block $x$ is preferably heated to such a temperature that, having regard to the nature and quantity of the medium, the conductivity of the medium is approximately at its highest value. When the temperature equalizing medium is in this condition, the thermal energy will be conveyed very nearly instantaneously and at exceedingly high efficiency through the heating surface 7 of the block $x$ to the heat delivery point (the surface 9), and the heat may be taken from this surface and utilized for the desired purposes by uncovering one or other of the openings 35, 36, 37 by moving the slider 45 and 46 or by removing the cover 47.

When the above mentioned favorable condition of the heat conductivity of the temperature equalizing medium has been reached, the fire may be completely removed and by replacing the stopper 26 and closing the sliders 45, 46 and the cover 47 it is possible to completely insulate the whole device. In this condition the heat which was stored under favorable and thermally economic conditions may be drawn off from the stove, according to requirements, during a long time without supplying further heat. For this purpose it is only necessary to move one or both of the sliders 45, 46 in the direction indicated by the arrow in Fig. 4 or to raise the cover 47 and to insert the boiling or baking vessel in the uncovered opening 35, 36 or 37 or in the oven 31.

In order to ensure the direct transference of the stored heat from the block $x$ to the object to be heated (the boiling or baking vessel) care must be taken that there is a good heat conducting connection between the object to be heated and the heat delivering surface 9. This may be attained in a number of different ways. In one form this favorable heat conductivity can be obtained by grinding the upper surface of the heat delivering surface 9 and the lower surface of the object to be heated, for example the saucepan. In this manner when such a saucepan is placed upon the surface 9 the ground surfaces contact uniformly at all points, and nowhere between the surface is there any interposed medium such as residual air. Another manner in which good conductivity may be obtained is by providing a film of easily fusible metal between the heat delivering surface and the object to be heated, the melting point of this metal being below the temperature at which heat is to be delivered. As an intermediate metal various alloys are suitable, for example, Wood's metal.

The heating device fulfills the most exacting requirements as far as thermal economy and manipulation are concerned. The construction of the heat reservoir as a block with passages and with substances inserted in these passages in the manner described renders it possible to attain in a simple manner the most complete thermal insulation conceivable. By using all the individual elements of the present invention, in combination a heating device is produced which, for example in its use as a kitchen stove, renders it possible, by heating once in 24 hours with a very much smaller quantity of fuel than has been possible up to now, to obtain a very rapid conduction of heat for a long time after the heating up. Moreover a feature of particular advantage is that no temperature fluctuations of any kind take place, but an absolutely uniform temperature, is obtained which both for boiling and also for baking is of great advantage.

I claim:

1. A heating device comprising a heat conducting block, a source of heat for heating said block and provided internally with a plurality of interconnected passages charged once and for all with a temperature equalizing medium, the metal block being completely enveloped in heat insulating material excepting at those parts of its surface which cooperate with the heat source and those parts of its surface which serve to deliver up heat.

2. A heating device according to claim 1 in which the block consists of a cast metal body having closed passages for the temperature equalizing medium, said passages being formed during the casting of the block.

3. A heating device according to claim 1 in which the heat delivering surface of the block is ground at those parts of the surface from which heat is taken.

4. A heating device according to claim 1 having a film of easily fusible metal at those parts of the surface from which heat is taken.

5. A heating device according to claim 1 having means for interposing heat insulating means between the heat delivering surface of the block and the heat receiving object.

6. In a heating device, the combination with the elements claimed in claim 1, of a heat delivery regulating device comprising means for raising the object which is to be heated from the heat delivering surface of the block.

7. In a heating device, the combination with the elements claimed in claim 1, of a heat delivery regulating device, a lever on the heat delivering surface of the block, and an actuating device for operating said lever.

In testimony whereof I affix my signature.

ALEXANDER PAIS.